United States Patent [19]

Jäger et al.

[11] Patent Number: 4,577,015
[45] Date of Patent: Mar. 18, 1986

[54] TRIPHENDIOXAZINE VINYL SULPHONE DYESTUFFS

[75] Inventors: Horst Jäger; Wolfgang Harms, both of Leverkusen; Karl J. Herd, Odenthal, all of Fed. Rep. of Germany

[73] Assignee: Bayer Aktiengesellschaft, Leverkusen, Fed. Rep. of Germany

[21] Appl. No.: 694,535

[22] Filed: Jan. 24, 1985

[30] Foreign Application Priority Data

Feb. 11, 1984 [DE] Fed. Rep. of Germany ....... 3404856
Oct. 31, 1984 [DE] Fed. Rep. of Germany ....... 3439756

[51] Int. Cl.$^4$ .................... C07D 498/02; C09B 19/00; C09B 19/02
[52] U.S. Cl. ......................................... 544/76; 8/657; 544/75
[58] Field of Search .................... 544/75, 76

[56] References Cited

U.S. PATENT DOCUMENTS

| | | | |
|---|---|---|---|
| 3,996,221 | 12/1976 | Leng et al. | 544/75 X |
| 4,092,478 | 5/1978 | Plant et al. | 544/76 |
| 4,336,377 | 6/1982 | Adam et al. | 544/74 |
| 4,400,504 | 8/1983 | Harms et al. | 544/76 |
| 4,472,575 | 9/1984 | Renfrew | 544/76 |
| 4,512,773 | 4/1985 | Anderton et al. | 544/74 X |

FOREIGN PATENT DOCUMENTS 101665  2/1984  European Pat. Off. .

Primary Examiner—Richard L. Raymond
Attorney, Agent, or Firm—Sprung Horn Kramer & Woods

[57] ABSTRACT

Triphendioxazine dyestuffs of the formula

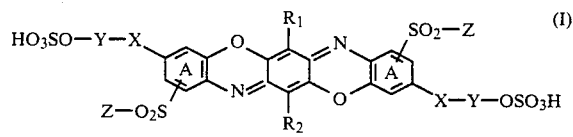

where the substitutents are as defined in the descriptive part, produce blue to reddish blue dyeings of good light and wet fastness on cellulose and polyamide materials. The new dyestuffs are obtained by oxidative cyclization of condensation products of appropriately substituted amines of the formula

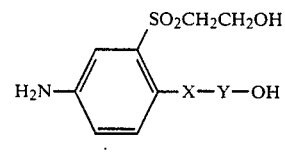

with 1,4-benzoquinones.

3 Claims, No Drawings

TRIPHENDIOXAZINE VINYL SULPHONE DYESTUFFS

The present invention relates to triphendioxazine dyestuffs of the general formula

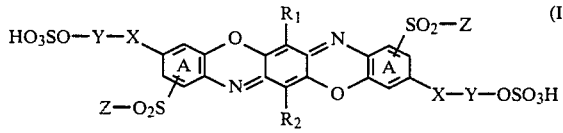

wherein
$R_1$, $R_2$ = H or substituent,
$X$ = $NR_3$, O or S,
$R_3$ = H or optionally substituted $C_1$-$C_4$-alkyl,
$Y$ = $C_2$-$C_6$-alkylene which is optionally substituted or interrupted in the alkylene chain by hetero atoms,
$Z$ = —CH=$CH_2$ or —$CH_2$—$CH_2$—W wherein
W = a detachable radical whose detachment is accompanied by the formation of a —CH=$CH_2$ group, for example —$OSO_3H$, —$SSO_3H$ or —$OPO_3H_2$, or —O-acyl, in particular —O—$C_1$-$C_4$-alkylcarbonyl, and the rings A can optionally have further customary substituents.

The —$SO_2Z$ radicals in the formula are preferably in the o-position relative to the —X—Y—$OSO_3H$ group.

Preferred dyestuffs of the formula (I) have the formula

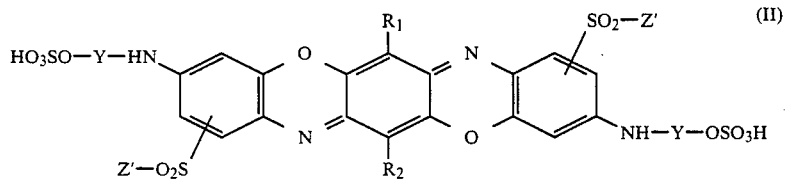

wherein
$R_1$, $R_2$ and Y are as defined above and
Z' denotes —$CH_2$—$CH_2$—$OSO_3H$ or —CH=$CH_2$,
or the formula

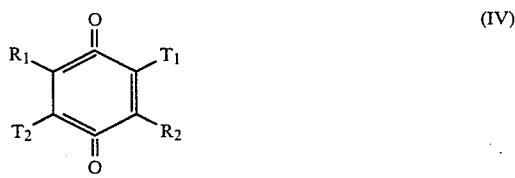

wherein Y' denotes $C_2$-$C_4$-alkylene.

Examples of substituents $R_1$ and $R_2$ are H, F, Cl, Br, $C_1$-$C_4$-alkyl, $C_1$-$C_4$-alkoxy, aryloxy, in particular optionally substituted phenoxy, acylamino, in particular $C_1$-$C_4$-alkylcarbonylamino and optionally substituted phenylcarbonylamino, acetylamino or benzoylamino, and optionally substituted carboxamido.

Examples of $R_3$ are methyl, ethyl, 1-propyl, 2-propyl, 1-butyl, 2-butyl and 2-methylpropyl, all of which can be substituted, for example by water-solubilising or hydrophilic groups, such as $SO_3H$, $OSO_3H$, COOH, OH or $OCH_3$.

Examples of suitable alkylene radicals Y are:

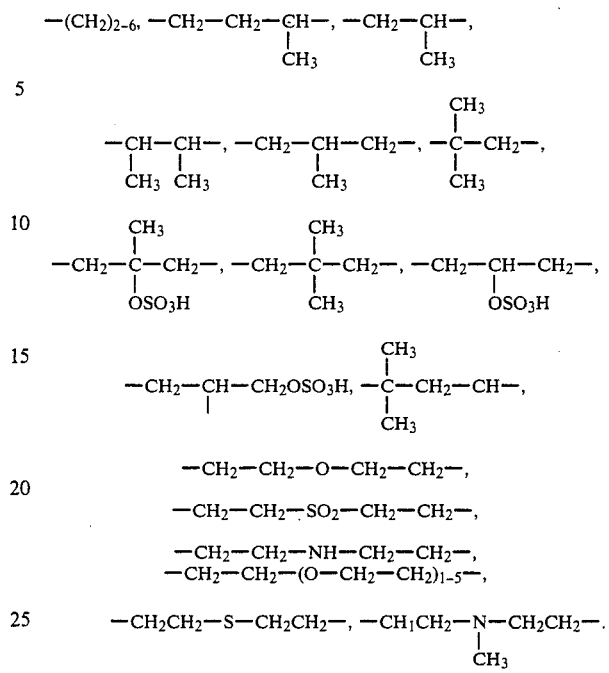

Compounds (I) are preferably prepared by condensing 1,4-benzoquinones of the formula

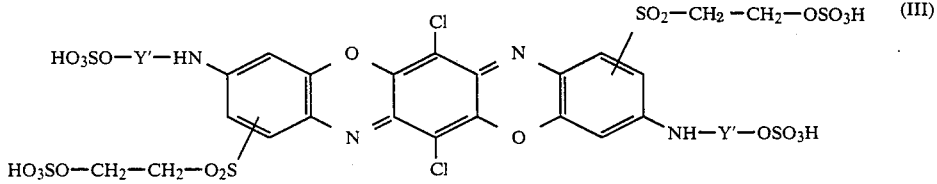

wherein
$T_1$ and $T_2$ each denote hydrogen, F, Cl, Br, O-alkyl or O-aryl and
$R_1$ and $R_2$ are as defined above, with compounds of the formula

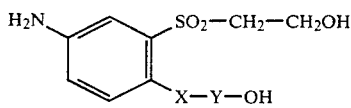 (V)

wherein X and Y are as defined above, to form compounds of the formula

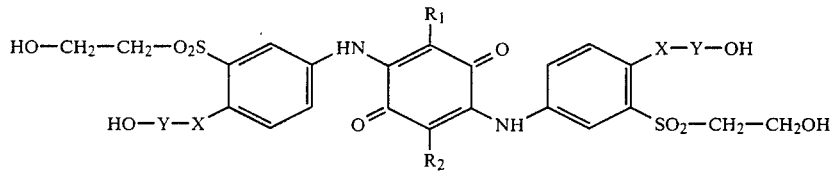 (VI)

wherein $R_1$, $R_2$, X and Y are as defined above, followed by ring closure in acid, preferably strongly acid, medium to form the corresponding compounds having —X—Y—OSO$_3$H and —SO$_2$CH$_2$CH$_2$OSO$_3$H groups which can be converted in conventional manner into, respectively, —SO$_2$—CH=CH$_2$ on the one hand and —SO$_2$CH$_2$CH$_2$SSO$_3$H and —SO$_2$CH$_2$CH$_2$OPO$_3$H$_2$ groups on the other.

The ring closure of condensation products (VI) can be effected, for example, by methods of the type described in German Offenlegungsschriften Nos. 2,122,262, 2,124,080, 2,302,382, 2,344,781, 2,503,611 and 2,823,828 and in British Patent Specification No. 2,019,872, in particular in concentrated sulphuric acid or especially in oleum having an SO$_3$ concentration of 1–50%, at temperatures of 10°–80°, if desired particularly advantageously in the presence of oxidising agents, such as potassium peroxodisulphate, ammonium peroxodisulphate or organic peroxides.

The new dyestuffs produce bright dyeings on cellulose and natural and synthetic polyamide materials. They are distinguished by high tinctorial strength.

As water-soluble reactive dyestuffs, the new dyestuffs are preferably of interest for dyeing hydroxyl- and amide-containing textile materials, in particular materials made of natural and regenerated cellulose and of nylon and polyurethane fibres, wool and silk.

Said materials are dyed or tinted by the methods which are common knowledge and industrially customary for water-soluble reactive dyestuffs. Light- and wet-fast brilliant dyeings and prints are then obtained.

The temperatures in the Examples are given in °C. The formulae of the water-soluble reactive dyestuffs in the description and in the Examples are those of the free acids. The dyestuffs are generally isolated and used in the form of their alkali metal salts, in particular the lithium, sodium or potassium salts.

The indicator numbers with which the hue is characterised in the Examples refer to the Colour Index hue indication chart.

The invention also relates to new amino compounds of the structure

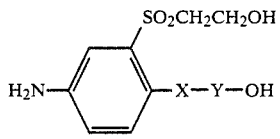 (V)

wherein X and Y are as defined above; of these, preference is given to amino compounds of the formula

 (VII)

wherein $X_1$=NH, O or S.

The invention also relates to processes for preparing (V). In one process, 2-halogeno-5-nitrophenyl β-hydroxyethyl sulphones

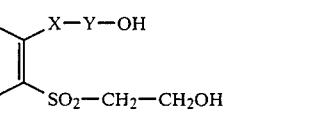 (VIII)

wherein

Hal=F, Cl, Br or I, which can be prepared by ethoxylating 2-halogeno-5-nitrobenzenesulphinic acids under neutral aqueous conditions, are reacted with compounds of the structure HX—Y—OH (IX) under heat and if desired under pressure, H—Hal being eliminated, and the resulting nitro-sulphones of the formula

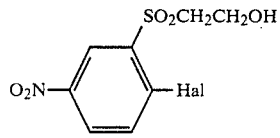 (X)

are subsequently, if possible without prior isolation, reduced to (V).

The condensation with the nucleophilic reactants (IX) is carried out above 70° C., most advantageously between 75° and 120°, if desired under pressure. The reaction medium can be water, any organic water-soluble solvent, for example any alcohol, DMF or DMSO, or a mixture of the two. If HX—Y—OH is present in excess it is also possible to dispense with a solvent altogether. To neutralise the hydrogen halide which is liberated, it is possible to add an auxiliary base, for example a tertiary amine, in particular a trialkylamine such as triethylamine, sodium hydrogencarbonate or sodium carbonate, or, if HNR$^3$—Y—OH is used, to use about twice the equimolar amount of this hydroxyalkylamine.

The concluding reduction can be effected catalytically (for example hydrogen/catalyst), with metal/acid (for example iron/acetic acid) or with other customary reducing agents for aromatic nitro compounds.

In another process, the alkali metal salts of the 2-halogeno-5-nitrobenzenesulphinic acids are condensed with HX—Y—OH compounds at above 80° C. in an aqueous reaction medium, if desired under pressure, and

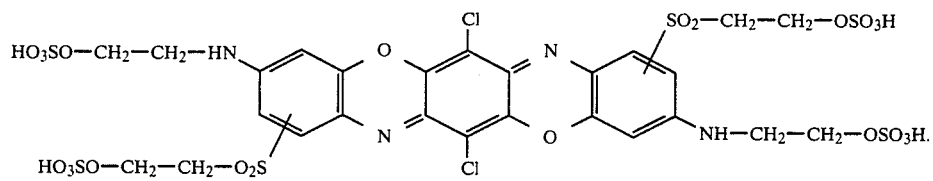

the condensation products

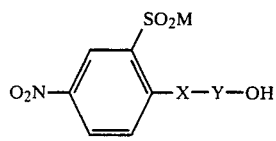

M=Li, Na or K are alkylated with ethylene oxide or chloroethanol under heat, pressure and neutral conditions. To keep the pH constant, an inorganic acid, for example sulphuric acid, is metered in continuously, or the reaction is carried out in a phosphate-buffered solution. The corresponding nitrosulphones (X) are then reduced to the corresponding amino compounds (V) as described in the first preparation process.

The compounds (X) can also be prepared by acylating o-substituted sulphones of the formula

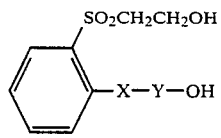

twice on the O and if desired the N, nitrating with sulphuric acid/nitric acid under relatively mild conditions, and finally deacylating by acid hydrolysis (cf. U.S. Pat. No. 2,784,204).

EXAMPLE 1

20.0 g of chloroanil condensation product of the formula

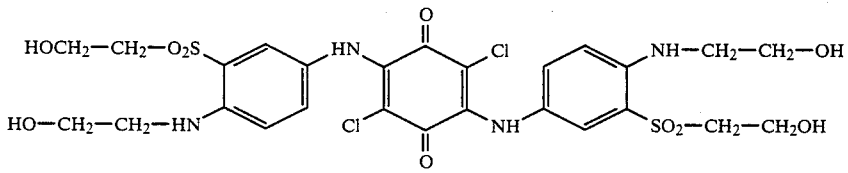

are added at 10°–20° to 50 ml of 20% strength oleum in the course of about an hour. To effect complete solution the mixture is afterwards stirred for 30 to 60 minutes, and the viscous mass then has added to it at 20°–25° with slight external cooling 15.6 g of potassium peroxodisulphate in the course of about 45 minutes. 30 Minutes after this addition the reaction has ended. The reaction mixture is stirred into 400 g of ice, and the resulting blue solution then has added to it dropwise first 2.5 g of trisodium phosphate in 20 ml of water and then about 460 ml of 4N sodium hydroxide solution with cooling and thorough stirring until the pH is 4.5 to 5.0. The dyestuff, which has come out of solution in the form of a pasty precipitate, is filtered off with suction, is washed with sodium chloride solution and is dried at 50° in a circulating air cabinet. The dyestuff has the formula C.I. indicator number 13

It dyes cotton at 40° to 60° from a long liquor in deep, somewhat reddish blue shades having excellent fastness properties.

The chloroanil condensation product used at the start of Example 1 is prepared as follows:

35 g of 5-nitro-2-β-hydroxyethylaminophenyl β-hydroxyethyl sulphone are suspended in 200 ml of methanol in an autoclave. After addition of 2 g of Raney nickel, 10 to 20 bar of hydrogen are injected, and the mixture is heated at 45° until there is no further consumption of subsequently injected hydrogen. The resulting solution or suspension is freed at 50° from the liquor by filtration, the filter residue is washed with a little water, and the filtrate has added to it 14.4 g of 2,3,5,6-tetrachloroquinone and 16 g of anhydrous sodium acetate. The mixture is then refluxed for 2 hours until tetrachloroquinone is no longer detectable. The condensation product, which has come out of solution in the form of a brown precipitate, is filtered off with suction, is washed with methanol or methanol/water and is dried at 60° in a circulating air cabinet.

It is also possible to evaporate the methanol solution obtained at the end of the catalytic reduction, to dissolve the residue of 5-amino-2-β-hydroxyethylaminophenyl β-hydroxyethyl sulphone in water, and to condense the solution at 45° with the chloroanil while the pH is maintained at 5.5 to 5.8 with 2N sodium carbonate solution. Under these conditions the condensation is complete after about an hour. The likewise precipitated brown sediment is filtered off with suction and washed with water.

EXAMPLE 2

If the oxidative ring closure of Example 1 is carried out not at 20° to 25° with 50 ml of 20% strength oleum but without the presence of peroxodisulphate in 30% strength oleum at 50°, this produces, on isolation from the reaction mixture, a similar dyestuff which dyes cellulose fibres in blue shades.

Further similar blue dyes of C.I. indicator number 13 are obtained when the 5-amino-2-(hydroxyalkylamino)-phenyl β-hydroxyethyl sulphones (V) of the subsequent Table are condensed with the indicated 1,4-benzoquinones (IV) and the condensation products are cyclised and sulphated in the manner described.

| Starting compounds V | Benzoquinone IV |
|---|---|
| 4-amino-2-(2-hydroxyethylsulfonyl)-N-(2-hydroxyethyl)aniline: H₂N–C₆H₃(SO₂–CH₂–CH₂OH)–NH–CH₂–CH₂–CH₂OH | Chloranil (2,3,5,6-tetrachloro-1,4-benzoquinone) |
| H₂N–C₆H₃(SO₂–CH₂–CH₂–OH)–NH–CH₂–CH₂–CH(OH)–CH₃ | " |
| H₂N–C₆H₃(SO₂–CH₂–CH₂–OH)–NH–CH₂–CH(OH)–CH₃ | " |
| H₂N–C₆H₃(SO₂–CH₂–CH₂OH)–NH–(CH₂)₄–OH | " |
| H₂N–C₆H₃(SO₂–CH₂–CH₂–OH)–NH–CH₂–CH₂–O–CH₂–CH₂–OH | " |
| H₂N–C₆H₃(SO₂–CH₂–CH₂OH)–NH–CH₂–CH₂–SO₂–CH₂–CH₂OH | " |
| H₂N–C₆H₃(SO₂–CH₂–CH₂OH)–NH–CH₂–CH₂–NH–CH₂–CH₂OH | " |
| H₂N–C₆H₃(SO₂–CH₂–CH₂–OH)–N(CH₃)–CH₂–CH₂–OH | " |
| H₂N–C₆H₃(SO₂–CH₂–CH₂OH)–N(CH₃)–CH₂–CH₂–CH₂–OH | " |
| H₂N–C₆H₃(SO₂–CH₂–CH₂–OH)–NH–C(CH₃)₂–CH₂OH | " |

| Starting compounds V | Benzoquinone IV |
|---|---|
| 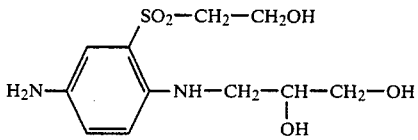 | " |
| 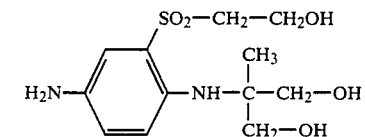 | " |
| 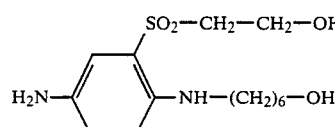 | " |
| 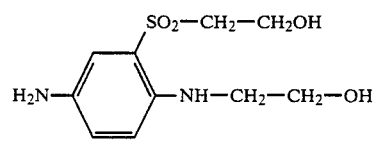 | 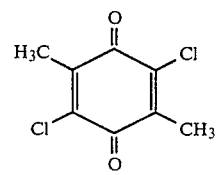 |
| " | 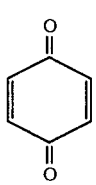 |
| " | 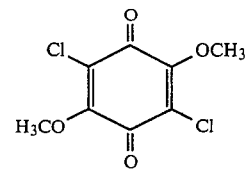 |
| " | 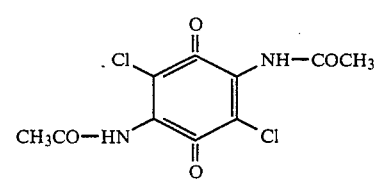 |
| " | 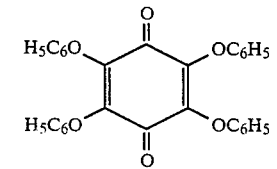 |
| " | 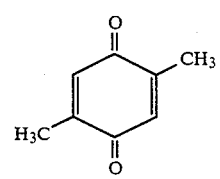 |

| Starting compounds V | Benzoquinone IV |
|---|---|
| " | 2,5-dibromo-3,6-dicarboxamide-1,4-benzoquinone (Br, CONH$_2$, H$_2$NOC, Br) |
| " | tetrafluoro-1,4-benzoquinone (F, F, F, F) |
| " | tetrabromo-1,4-benzoquinone (Br, Br, Br, Br) |

EXAMPLE 3

5-Amino-2(2-hydroxyethyl)aminophenyl 2-hydroxyethyl sulphone 209 g of a moist paste of sodium 2-chloro-5-nitrobenzenesulphinate (58.4% strength) are dissolved in 250 ml of water. The pH should be between 7 and 8. The reaction vessel is flushed with nitrogen while the solution is raised to 60° C. Under compliance with the prescribed safety regulations, ethylene oxide is slowly passed at pH 7–9 into the sealed reaction vessel, together with 25% strength sulphuric acid. A total of 110 to 120 g of ethylene oxide and about 204 g of sulphuric acid are consumed for pH control. As soon as no starting material is detectable, the mixture is heated at pH 7° to 85° C. for 1 hour, and the apparatus is subsequently flushed with nitrogen. When cooled down to room temperature, the mixture is filtered with suction, and the filter residue is washed with about 200 ml of water and is dried at 70° C. in vacuo. 118 g of crystalline 2-chloro-5-nitrophenyl 2-hydroxyethyl sulphone are isolated.

93 g of 2-chloro-5-nitrophenyl 2-hydroxyethyl sulphone are heated to the boil in 84 ml of isopropanol. The heat supply is cut back, and 50 g of ethanolamine are added in the course of 15 minutes. The resulting viscous solution is refluxed for a further hour. Thereafter the reaction is complete, and the solution of the 2-(2-hydroxyethyl)amino-5-nitrophenyl 2-hydroxyethyl sulphone can be directly hydrogenated under the catalytic conditions. To isolate the substitution product, 250 ml of water and 100 g of ice are added at 95°–80° C. The mixture is afterwards stirred for 2 hours and is brought to pH 6 with 12 ml of hydrochloric acid. The product, which has come out of solution in the form of crystals, is filtered off with suction and dried. The yield of 2-(hydroxyethyl)amino-5-nitrophenyl 2-hydroxyethyl sulphone (melting point 118° C.) is 98.5 g.

$^1$H—NMR:

O$_2$N—⟨phenyl with SO$_2$CH$_2$CH$_2$OH and NH—CH$_2$CH$_2$OH⟩

τ = 1.59 (d,1H); 1.75 (dd,1H); 2.69 (t,NH); 2.97 (d,1H); 5.04 (t,OH); 5.13 (t,OH); 6.26 (m,2H); 6.35 (m,2H); 6.48 (m,2H); 6.57 (m,2H).

(All the $^1$H-NMR data given in this application were determined in d$_6$-DMSO as solvent, using TMS as the internal standard.)

The above, isolated aminonitrosulphone can be catalytically hydrogenated as described in Example 1. However, as already indicated above, it is better to reduce the reaction solution of the ethanolamine substitution directly, i.e. without isolating the 2-(2-hydroxyethyl)amino-5-nitrophenyl 2-hydroxyethyl sulphone. This is done by diluting with 100 ml of isopropanol, adding 5 g of Raney nickel, heating to 60° C., and injecting about 24 litres of hydrogen. The hydrogen pressure should be maintained within the range from 7 to 10 bar. When the rate of consumption gradually decreases after about 2.5 hours, the temperature can be raised to 75° C. At the end of the reaction the reaction solution is diluted with 200 ml of hot water at 70° C. and is separated hot from the catalyst. The resulting dark solution of 5-amino-2-(2-hydroxyethyl)aminophenyl 2-hydroxyethyl sulphone is directly further reacted with chloroanil (see Example 1).

To isolate and characterise the reduction product the warm solution is concentrated to 200 ml, the concentrated solution is cooled down to 20° C., and the crystalline product is filtered off with suction. Drying at 70° C. in vacuo leave 84 g of 5-amino-2-(2-hydroxyethyl)aminophenyl 2-hydroxyethyl sulphone (of melting point 130° C.).

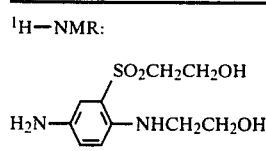

| ¹H—NMR: | τ = 3.10 (d,1H); 3.22 (dd,1H); 3.37 (d,1H); 4.45 (t,NH); 5.20 (t,OH); 5.27 (t,OH); 5.32 (s,NH₂); 6.40 (m,4H); 6.65 (t,2H); 6.90 (m,2H). |

The necessary intermediate 2-(2-hydroxyethyl-)amino-5-nitrophenyl 2-hydroxyethyl sulphone can also be prepared as follows:

(A) A solution of 122 g of sodium 2-chloro-5-nitrobenzenesulphinate in 300 ml of water has added to it 100 g of ethanolamine, and the mixture is stirred at 110° C. under 0.5 bar in an autoclave for 4 hours. When cold, the yellow reaction solution is neutralised with hydrochloric acid, and 90 g of sodium chloride are added for salting out. The result is 215 g of moist paste of sodium 2-(2-hydroxyethyl)amino-5-nitrobenzenesulphinate.

(B) 122 g of sodium 2-chloro-5-nitrobenzenesulphinate are kneaded together with 150 g of ethanolamine, and the mixture is gradually heated to 100° C. After 30 minutes at 100° C. 500 ml of water are added, the reaction solution is neutralised with hydrochloric acid, and the sodium 2-(2-hydroxyethyl)amino-5-nitrobenzenesulphinate is isolated as above, by salting out.

The 215 g of moist sulphinate paste are dissolved in 250 ml of water and are alkylated under pressure at 60° C. analogously to sodium 2-chloro-5-nitrobenzenesulphinate using 120 g of ethylene oxide and about 200 g of 25% strength sulphuric acid. The result is 121 g of crystalline pale yellow 2-(2-hydroxyethyl)amino-5-nitrophenyl 2-hydroxyethyl sulphone.

If the ethanolamine of Example 3 is replaced by different hydroxyalkylamines of the same type, the following nitroamino and diamino sulphones can be prepared:

EXAMPLE 4

2-(2-hydroxyethyl)methylamino-5-nitrophenyl 2-hydroxyethyl sulphone (pale yellow, melting point 106° C.).

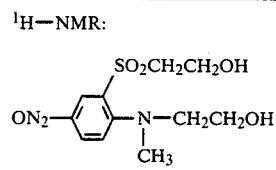

| ¹H—NMR: | τ = 1.41 (d,1H); 1.63 (dd,1H); 2.41 (d,1H); 5.30 (t,OH); 5.39 (t,OH); 6.20 (t,2H); 6.37 (m,4H); 6.70 (t,2H); 7.08 (s,CH₃). |

5-Amino-2-(2-hydroxyethyl)methylaminophenyl 2-hydroxyethyl sulphone (crystallising oil).

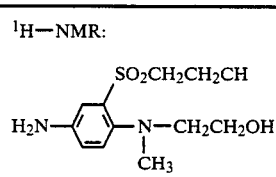

| ¹H—NMR: | τ = 2.82 (d,1H); 2.96 (d,1H); 3.21 (dd,1H); 4.62 (s,NH₂); 5.25 (broad OH); 5.68 (broad OH); 6.25 (m,2H); 6.37 (m,2H); 6.50 (t,2H); 7.12 (t,2H); 7.42 (s,CH₃). |

EXAMPLE 5

2-(3-Hydroxypropyl)amino-5-(nitrophenyl) 2-hydroxyethyl sulphone (pale yellow, melting point 65° C.).

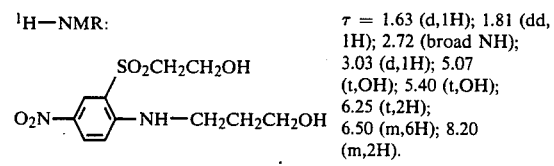

| ¹H—NMR: | τ = 1.63 (d,1H); 1.81 (dd,1H); 2.72 (broad NH); 3.03 (d,1H); 5.07 (t,OH); 5.40 (t,OH); 6.25 (t,2H); 6.50 (m,6H); 8.20 (m,2H). |

5-Amino-2-(3-hydroxypropyl)aminophenyl 2-hydroxyethyl sulphone (crystallising oil).

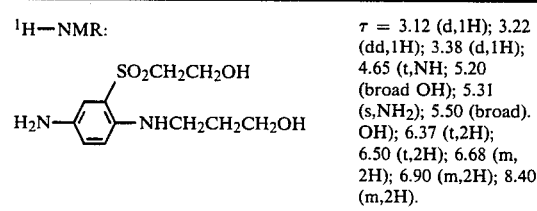

| ¹H—NMR: | τ = 3.12 (d,1H); 3.22 (dd,1H); 3.38 (d,1H); 4.65 (t,NH; 5.20 (broad OH); 5.31 (s,NH₂); 5.50 (broad). OH); 6.37 (t,2H); 6.50 (t,2H); 6.68 (m, 2H); 6.90 (m,2H); 8.40 (m,2H). |

EXAMLE 6

2-(3'-(2''-Hydroxyethyl)methylaminopropyl)amino-5-nitrophenyl 2-hydroxyethyl sulphone (yellow oil).

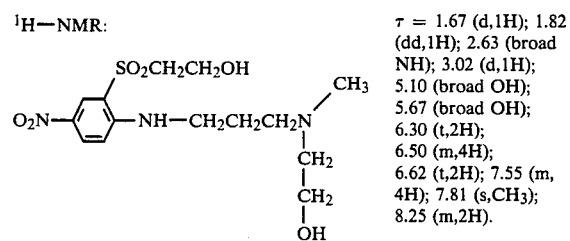

| ¹H—NMR: | τ = 1.67 (d,1H); 1.82 (dd,1H); 2.63 (broad NH); 3.02 (d,1H); 5.10 (broad OH); 5.67 (broad OH); 6.30 (t,2H); 6.50 (m,4H); 6.62 (t,2H); 7.55 (m, 4H); 7.81 (s,CH₃); 8.25 (m,2H). |

5-Amino-2-(3'-(2''-hydroxyethyl)methylaminopropyl)aminophenyl 2-hydroxyethyl sulphone (oil).

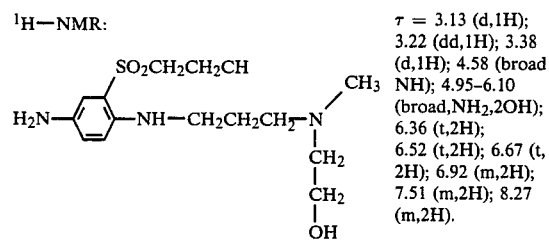

| ¹H—NMR: | τ = 3.13 (d,1H); 3.22 (dd,1H); 3.38 (d,1H); 4.58 (broad NH); 4.95–6.10 (broad,NH₂,2OH); 6.36 (t,2H); 6.52 (t,2H); 6.67 (t, 2H); 6.92 (m,2H); 7.51 (m,2H); 8.27 (m,2H). |

EXAMPLE 7

2-(2-Hydroxypropyl)amino-5-nitrophenyl 2-hydroxyethyl sulphone (melting point 85° C.).

| | |
|---|---|
| $^1$H—NMR: 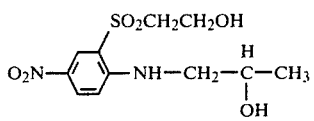 | τ = 1.65 (d,1H); 1.83 (dd,1H); 2.70 (t,NH); 3.02 (d, 1H); 4.97 (t,OH); 5.12 (t,OH); 6.10 (m,1H); 6.23 (t,2H); 6.48 (t,2H); 4.60, 4.80 (m,2H); 8.80 (d,3H). |

5-Amino-2-(2-hydroxypropyl)aminophenyl 2-hydroxyethyl sulphone (crystallising oil).

| | |
|---|---|
| $^1$H—NMR: 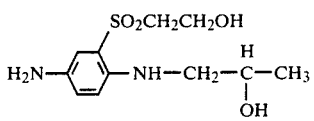 | τ = 3.08 (d,1H); 3.21 (dd,1H); 3.38 (d,1H); 4.41 (t,NH); 5.21 (broad m,NH$_2$, 2OH); 6.15 (m, 1H); 6.36 (t,2H); 6.63 (t,2H); 6.90, 7.10 (m,2H); 8.83 (d,3H). |

EXAMPLE 8

5-Amino-2-(2-hydroxy)ethoxyphenyl 2-hydroxyethyl sulphone 136 g of sodium 2-(hydroxy)ethoxy-5-nitrobenzenesulphinate are dissolved in 250 ml of water. The solution is brought to pH 7-8. The reaction vessel is checked for tightness and is flushed with nitrogen. Meanwhile the solution is heated up to 60° C. The reaction vessel is sealed, and 110-120 g of ethylene oxide are passed in at constant pH 7-9 in the course of 4-5 hours. A constant pH is maintained by continuously adding a total of 200 g of 25% strength sulphuric acid. As soon as there is no longer any evidence of starting sulphinate in a thin layer chromatogram, the mixture is heated at 85° C. at pH 7 for an hour, and the apparatus is then flushed with nitrogen. On cooling a pale yellow product crystallises out; it is filtered off with suction, is washed with a little water, and is dried.

The yield of 2-(2-hydroxy)ethoxy-5-nitrophenyl 2-hydroxyethyl sulphone is 132 g.

| | |
|---|---|
| $^1$H—NMR: 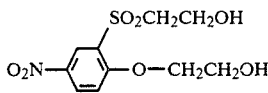 | τ = 1.57 (d,1H); 1.65 (dd,1H); 2.32 (d,1H); 5.25 (broad s,2OH) 6.25 (m,4H); 6.78 (m,4H); |

117 g of 2-(hydroxy)ethoxy-5-nitrophenyl 2-hydroxyethyl sulphone are dissolved in 250 ml of methanol, 5 g of Raney nickel are added, and the mixture is heated to 60° C. 34 Liters of hydrogen are then injected, and the temperature is maintained at 60° C. until the absorption has ended. When cold, the solution is separated from the catalyst and can then be directly further reacted with chloroanil. To isolate and characterise the product, the solvent is distilled off. This leaves 102 g of 5-amino-2-(2-hydroxy)ethoxyphenyl 2-hydroxyethyl sulphone as a viscous oil.

| | |
|---|---|
| $^1$H—NMR: 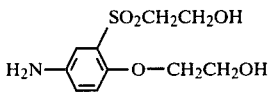 | τ = 2.64 (d,1H); 2.79 (d,1H); 3.12 (dd,1H); 4.32 (s,NH$_2$); 5.17 (broad OH); 5.28 (broad OH); 6.44 (m, 4H); 6.62 (t,2H); 7.15 (t,2H). |

EXAMPLE 9

5-Amino-2-(2-hydroxyethyl)mercaptophenyl 2-hydroxyethyl sulphone 93 g of 2-chloro-5-nitrophenyl 2-hydroxyethyl sulphone are refluxed for 6 hours in 200 ml of isopropanol together with 50 g of solid sodium carbonate and 70 g of mercaptoethanol. The reaction mixture is separated at 50° C. from the precipitated salts. The solution can be directly reduced in this form. To isolate the product, the solution is evaporated to dryness in a rotary evaporator, the residue is treated with 300 ml of water, and the crystalline sediment is filtered off with suction. Drying leaves 91 g of 2-(2-hydroxyethyl)mercepto-5-nitrophenyl 2-hydroxyethyl sulphone having a melting point of 109° C.

| | |
|---|---|
| $^1$H—NMR: 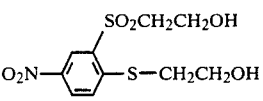 | τ = 1.43 (d,1H); 1.63 (dd, 1H); 2.12 (d,1H); 4.90 (t,OH); 5.19 (t,OH); 6.25 (m,6H); 6.67 (t, 2H). |

The above reaction solution has added to it 5 g of Raney nickel and is reduced with hydrogen as described for the corresponding oxygen compound in Example 8. 94 g of 5-amino-2-(2-hydroxyethyl)mercaptophenyl 2-hydroxyethyl sulphone are isolated in the form of a viscous, somewhat dark oil.

| | |
|---|---|
| $^1$H—NMR: 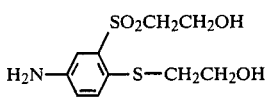 | τ = 2.67 (d,1H); 2.83 (d,1H); 3.25 (dd,1H); 4.34 (s,NH$_2$); 5.22 (broad s,2OH); 6.32 (m,4H); 6.50 (t,2H); 7.07 (t,2H). |

We claim:
1. Triphendioxazine dyestuffs of the general formula

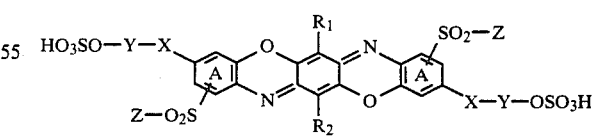

wherein
$R_1$, $R_2$=H, F, Cl, Br, $C_1$-$C_4$-alkoxy, $C_1$-$C_4$-alkyl, phenoxy or acylamido;
X=NR$_3$, O or S wherein
$R_3$=H, $C_1$-$C_4$-alkyl, optionally substituted by SO$_3$H, OSO$_3$H, COOH, OH or OCH$_3$;
Y=$C_2$-$C_6$-alkylene which is optionally interrupted by O, SO$_2$, NH, S, NCH$_3$ or substituted by OSO$_3$H;
Z=—CH=CH$_2$ or —CH$_2$—CH$_2$—w wherein W=$OSO_3H$, $SSO_3H$, $OPO_3H_2$, $OC_1$-$C_4$-alkylcarbonyl.
2. Dyestuffs of claim 1 the formula
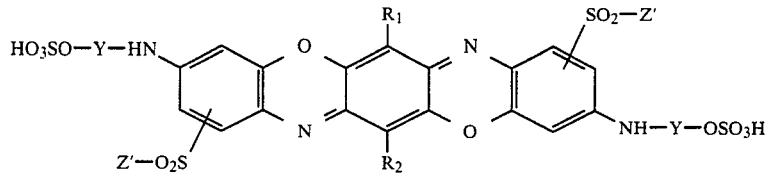
wherein
$R_1$, $R_2$ and Y are as defined in claim 1 and Z' denotes —$CH_2$—$CH_2$—$OSO_3H$ or —$CH=CH_2$.
3. Dyestuffs of the formula
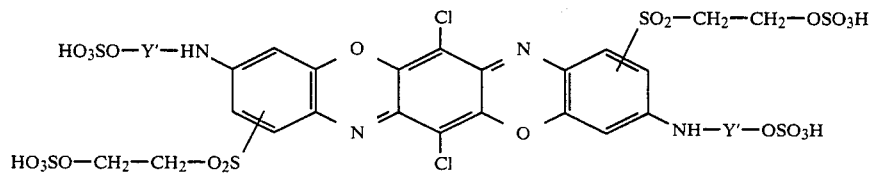
wherein Y' denotes $C_2$-$C_4$-alkylene.
* * * * *